United States Patent
Brems et al.

(10) Patent No.: US 7,454,177 B2
(45) Date of Patent: Nov. 18, 2008

(54) WIRELESS COMMUNICATION DEVICE WITH ENHANCED FEATURE SET

(75) Inventors: Doug Brems, San Diego, CA (US); David Schumann, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 733 days.

(21) Appl. No.: 10/731,054

(22) Filed: Dec. 8, 2003

(65) Prior Publication Data

US 2005/0124396 A1 Jun. 9, 2005

(51) Int. Cl.
*H04B 1/38* (2006.01)

(52) U.S. Cl. .......... 455/90.2; 455/90.3; 455/575.1; 455/517

(58) Field of Classification Search ... 455/575.1–575.4, 455/575.6, 575.7, 566, 565, 550.1, 564, 90.1–90.3, 455/517, 552.1, 518, 519, 520
See application file for complete search history.

(56) References Cited

U.S. PATENT DOCUMENTS

| 6,308,084 | B1* | 10/2001 | Lonka ............ 455/556.1 |
| 7,047,053 | B2* | 5/2006 | Lee ............ 455/575.3 |
| 7,146,197 | B2* | 12/2006 | Kang et al. ............ 455/575.1 |
| 7,200,429 | B2* | 4/2007 | Park et al. ............ 455/575.4 |
| 2001/0049296 | A1* | 12/2001 | Lee et al. ............ 455/566 |
| 2004/0198437 | A1* | 10/2004 | Yamamoto et al. ............ 455/556.1 |
| 2004/0204122 | A1* | 10/2004 | Opela et al. ............ 455/565 |
| 2006/0079301 | A1* | 4/2006 | Kim et al. ............ 455/575.3 |

\* cited by examiner

*Primary Examiner*—John J Lee

(57) ABSTRACT

An multi-position wireless communication device comprises a first housing portion and a second housing portion. The second housing portion is capable of being arranged in a first closed position relative to the first housing portion and in a second open position relative to the first housing portion. The wireless communication device further comprises at least one external key situated on the exterior surface of one of the first and second housing portions. The at least one external key is capable of being activated by a user when the wireless communication device in the closed position for defining a call recipient and for initiating a call to the call recipient.

9 Claims, 2 Drawing Sheets

WIRELESS COMMUNICATION DEVICE WITH ENHANCED FEATURE SET

BACKGROUND OF THE INVENTION

1. Field of the Invention

The present invention relates to the field of communication devices. More specifically, the invention relates to wireless communication devices.

2. Related Art

A typical wireless communication device, such as a mobile phone, comprises, among other things, a processor coupled to a memory and to a transceiver, each enclosed in a housing. A mobile power source, such as a battery, is coupled to and supplies power to the processor, the memory and the transceiver. A speaker and a microphone are also enclosed within the housing for transmitting and receiving, respectively, acoustic signals to and from a user of the wireless communication device. The wireless communication device communicates information by transmitting and receiving electromagnetic ("EM") energy in the radio frequency ("RF") band via an antenna coupled to the transceiver.

As use of wireless communication devices becomes more prevalent, customer demands for improved features have likewise grown. In particular, the desire for mobile phones capable of being arranged in a closed position as well as an open position, such a "clam shell" arrangement, has grown. Wireless communication devices incorporating such a feature are also referred to as "multi-position mobile phones" in the present application. The multi-position feature is desirable because the compact size of such mobile phones in the closed position results in improved user comfort and convenience for portable transport and storage, e.g., compared to fixed, one-piece (or "single-position") mobile phones.

In the closed position, conventional multi-position mobile phones provide a limited number of features. Typically, such features have been limited to tasks related to receiving an incoming call, such as providing the ability to answer a call, display the phone number or identity of the calling party, turn on/off the phone, and adjust the ring volume or ring alert mode. The primary display and most of the keys otherwise available in the open position are unavailable for use in the closed position. As such, much of the phone's functionality is disabled in the closed position by design since, aside from answering incoming calls, multi-position mobile phones are generally intended to be placed in storage in the closed position.

In the open position, however, multi-position mobile phones generally provide all or most of the functions available to single-position mobile phones while providing an ergonomic shape, i.e., by strategically positioning speaker and microphone elements for conversational use. Consequently, multi-position mobile phones must first be placed in the open position before a large number of functions, such as initiating call, for example, are made available to the user. This burden is an acknowledged inconvenience associated with conventional multi-position mobile phones for achieving the compact size of the device in the closed position. On the other hand, reduced-size single-position phones provide a compact portable size at the expense of poor ergonomics for conversational use.

SUMMARY OF THE INVENTION

A wireless communication device with an improved feature set is disclosed which addresses and resolves one or more of the disadvantages associated with conventional wireless communication devices, as discussed above.

By way of illustration, an exemplary wireless communication device comprises a first housing portion having an exterior surface and a second housing portion having an exterior surface, such as a multi-position mobile phone, for example, wherein the second housing portion is capable of being arranged in a first closed position relative to the first housing portion and in a second open position relative to the first housing portion. The wireless communication device further comprises a transceiver situated within one of the first and second housing portions, and is coupled to an antenna for transmitting and receiving radio frequency signals. The wireless communication device further comprises at least one external key situated on one of the exterior surfaces of the first and second housing portions. In accordance with this particular embodiment, the at least one external key is capable of being activated by a user when the wireless communication device in the closed position for defining a call recipient and for initiating a call to the call recipient. Thus, the inconvenience associated with arranging and rearranging the wireless communication device for defining a call recipient and initiating the call to the call recipient is eliminated or substantially reduced. Such an approach significantly improves the convenience of establishing and conducting single-duplex and/or full-duplex communication calls, as discussed in greater detail below.

The wireless communication device may additionally provide the capability for the user to select a directory of call recipients and select one of the call recipients from the directory in the closed position. Alternatively, the wireless communication device may provide the capability for the user to manually define a call recipient's phone number in the closed position.

According to another embodiment of the present invention, when the wireless communication device is arranged in the closed position, a first dimension of the wireless communication device is smaller than a corresponding dimension of the wireless communication device when the wireless communication device is arranged in the open position, thereby achieving a significantly reduced and compact form factor in the closed position and improving user comfort and convenience for portable transport and storage of the wireless communication device.

Other features and advantages of the present invention will become more readily apparent to those of ordinary skill in the art after reviewing the following detailed description and accompanying drawings.

DETAILED DESCRIPTION OF THE INVENTION

Figures 1A, 1B:
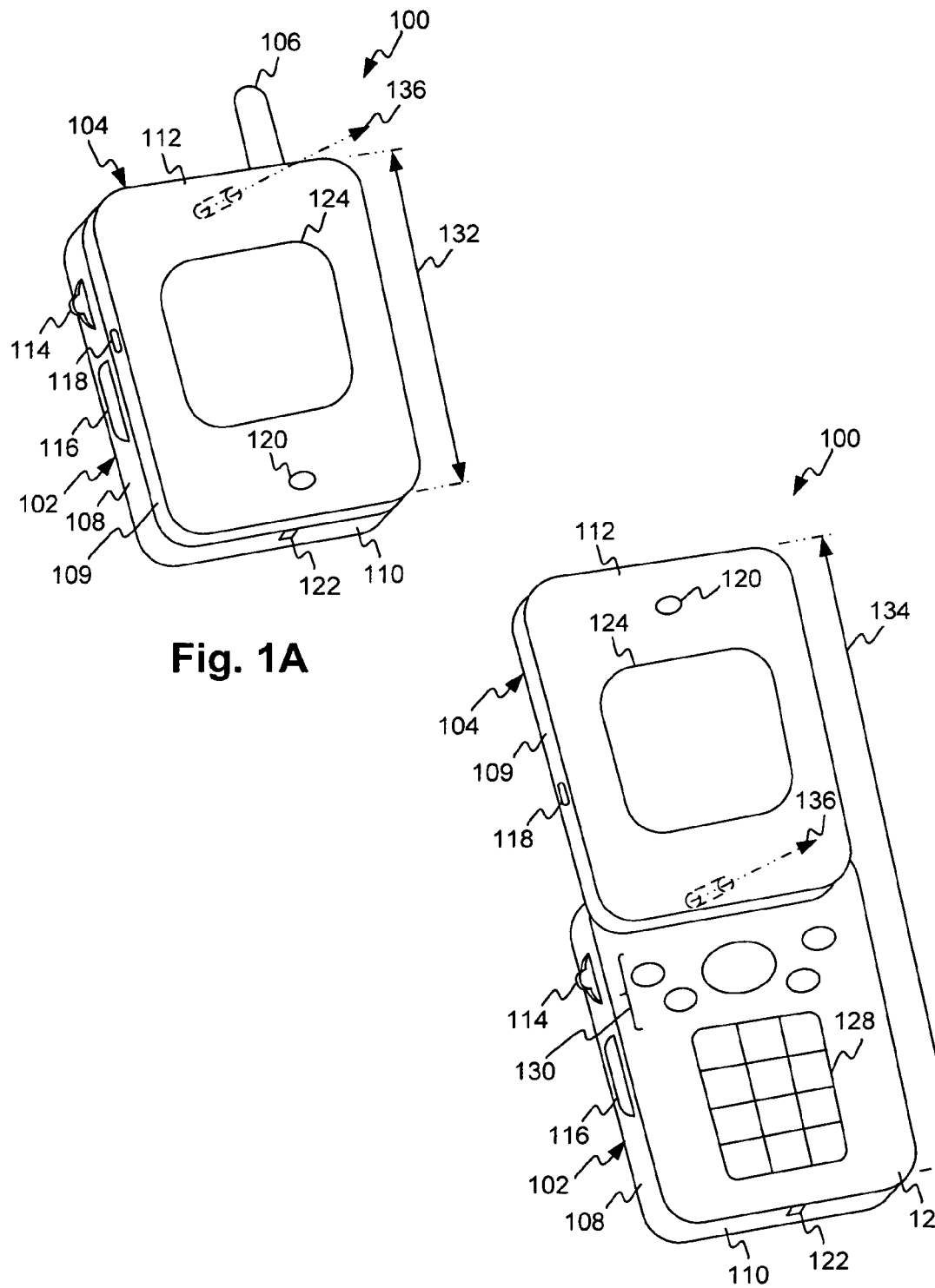
FIG. 1A illustrates a front perspective view of an exemplary wireless communication device arranged in a closed position according to one embodiment of the present invention.
FIG. 1B illustrates a front perspective view of the exemplary wireless communication device of FIG. 1A arranged in an open position according to one embodiment of the present invention.

Referring first to FIGS. 1A and 1B, exemplary wireless communication device 100 is shown arranged in multiple positions according to one embodiment of the present invention. More particularly, wireless communication device 100 is shown in a front perspective view arranged in a first ("closed") position in FIG. 1A and in a front perspective view arranged in a second ("open") position in FIG. 1B. For example, wireless communication device 100 may be a multi-position mobile phone capable of communicating RF signals in one or more frequency bands. As such, wireless communication device 100 is also referred to as "multi-position mobile phone 100" in the present application.

As shown in FIG. 1A, multi-position mobile phone 100 comprises first housing portion 102 and second housing portion 104. In the present application, first housing portion 102 is also referred to as "main housing 102" and second housing portion 104 is also referred to as "secondary housing 104." Main housing 102 includes a plurality of exterior surfaces exposed in the closed position as shown in FIG. 1A including exterior side surface 108 and exterior bottom surface 110. Similarly, secondary housing 104 includes a plurality of exterior surfaces exposed in the closed position including exterior front surface 112 and exterior side surface 109.

Although not shown for ease of illustration in the Figures, multi-position mobile phone 100 typically comprises a processor coupled to a memory and to a transceiver, each mounted within one of main housing 102 or secondary housing 104. A mobile power source (not shown), such as a battery, supplies power to various components of multi-position mobile phone 100. The transceiver is further coupled to antenna 106 for transmission and reception of RF signals. In the particular embodiment shown in FIG. 1A, antenna 106 extends through an aperture defined in the top surface of main housing 102.

At least one external key is situated on an exterior surface of main housing 102 or secondary hosing 104 for defining a call recipient and initiating a call to the call recipient. In the particular embodiment shown in FIGS. 1A and 1B, key 114 in situated on exterior side surface 108 of main housing 102 for defining a call recipient, and key 116 is situated on exterior side surface 108 of main housing 102 for initiating a call when multi-position mobile phone 100 is situated in the closed position. It is noted that in other embodiments a single key may be used to perform the functions of keys 114 and 116. As discussed below, key 116 may be configured to perform one or more additional functions after a call has been initiated. Also shown in FIGS. 1A and 1B, key 118 (also referred to as "backspace key 118" in the present application) is situated on exterior side surface 109 of secondary housing 104 for providing additional functionality in the closed position of multi-position mobile phone 100, as described below.

Microphone 122 is situated on exterior bottom surface 110 of main housing 102 for receiving acoustic signals, and speaker 120 is situated on exterior front surface 112 of secondary housing 104 for generating acoustic signals. As shown in FIGS. 1A and 1B, display 124 is also situated on exterior front surface 112 of secondary housing 104 for displaying text and graphical information to the user of multi-position mobile phone 100, as described below. Display 124 may, for example, be a multi-line color liquid crystal display ("LCD"). As shown in FIGS. 1A and 1B, microphone 122, display 124 and speaker 120 may be arranged for use in both the closed and open positions.

In the particular embodiment shown in FIGS. 1A and 1B, secondary housing 104 is rotatably mounted to main housing 102 about axis 136, although other techniques for interconnecting main housing 102 with secondary housing 104 may be used in conjunction with present invention for arranging mobile phone 100 in multiple positions. For example, secondary housing 104 may be alternatively slidably mounted to main housing 102. In contrast to FIG. 1B, secondary housing 104 can be arranged to cover interior front surface 126 of main housing 102 in the closed position as depicted in FIG. 1A. Thus, keys 128 and 130 situated on interior front surface 126 of main housing 102 are generally inaccessible in the closed position of multi-position mobile phone 100. However, as shown in FIG. 1B, secondary housing 104 may also be arranged so that interior front surface 126 of main housing 102 is uncovered and keys 128 and 130 situated on interior front surface 126 are accessible. By way of illustration, keys 128 may be used from receiving text and numerical information while keys 130 may be used for receiving commands and/or navigational information from the user. Keys 114,116 and 118 may also be configured for use in the open position and, if desired, may be assigned functions different from those defined in the closed position. As shown in FIGS. 1A and 1B, the first housing portion 102 defines a first plane and further includes an interior surface, the second housing portion 104 defines a second plane parallel with the first plane and covers the interior surface of the first housing portion 102 when the second housing portion 104 is arranged in the closed position and rotates about axis 136 perpendicular to the first Diane and the second Diane while maintaining a parallel relationship with the first housing portion 102 uncovering the interior surface of the first housing portion 102 when the second housing portion 104 is arranged in the open position. To open the wireless communication device 100, one rotates the second housing portion 104 from the closed position to the open position about the axis 136 perpendicular to the first plane and the second Plane while maintaining a parallel relationship with the first housing portion 102.

As noted above, microphone 122, display 124 and speaker 120 may also be arranged for use in the open position, as well as for use in the closed position. In the open position (FIG. 1B), microphone 122 and speaker 120 are arranged in a particularly strategic and ergonomic position when the device is held against or proximate the user's head during conversational use. Thus, dimension 132 corresponding to the height of multi-position mobile phone 100 arranged in the closed position of FIG. 1A is smaller than dimension 134 corresponding to the height of multi-position mobile phone 100 arranged in the open position of FIG. 1B. As a further benefit, multi-position mobile phone 100 is compact and may easily stored and transported in the closed position. As shown in FIGS. 1A and 1B, the second exterior surface 112 of the second housing portion 104 includes speaker 120 capable of generating acoustic signals when the second housing portion 104 is arranged in the closed position, the speaker 120 is located adjacent to microphone 122 when the second housing portion 104 is arranged in the closed position (FIG. 1A) and located at an opposite end of the wireless communication device 100 when the second housing portion 104 is arranged in the open position (FIG. 1B). To open the wireless communication device 100, one moves the second housing portion 104 from the closed position (FIG. 1A) where the speaker 120 is located adjacent to the microphone 122 to the open position (FIG. 1B) where speaker 120 is located at an opposite end of the wireless communication device 100.

Figure 2:
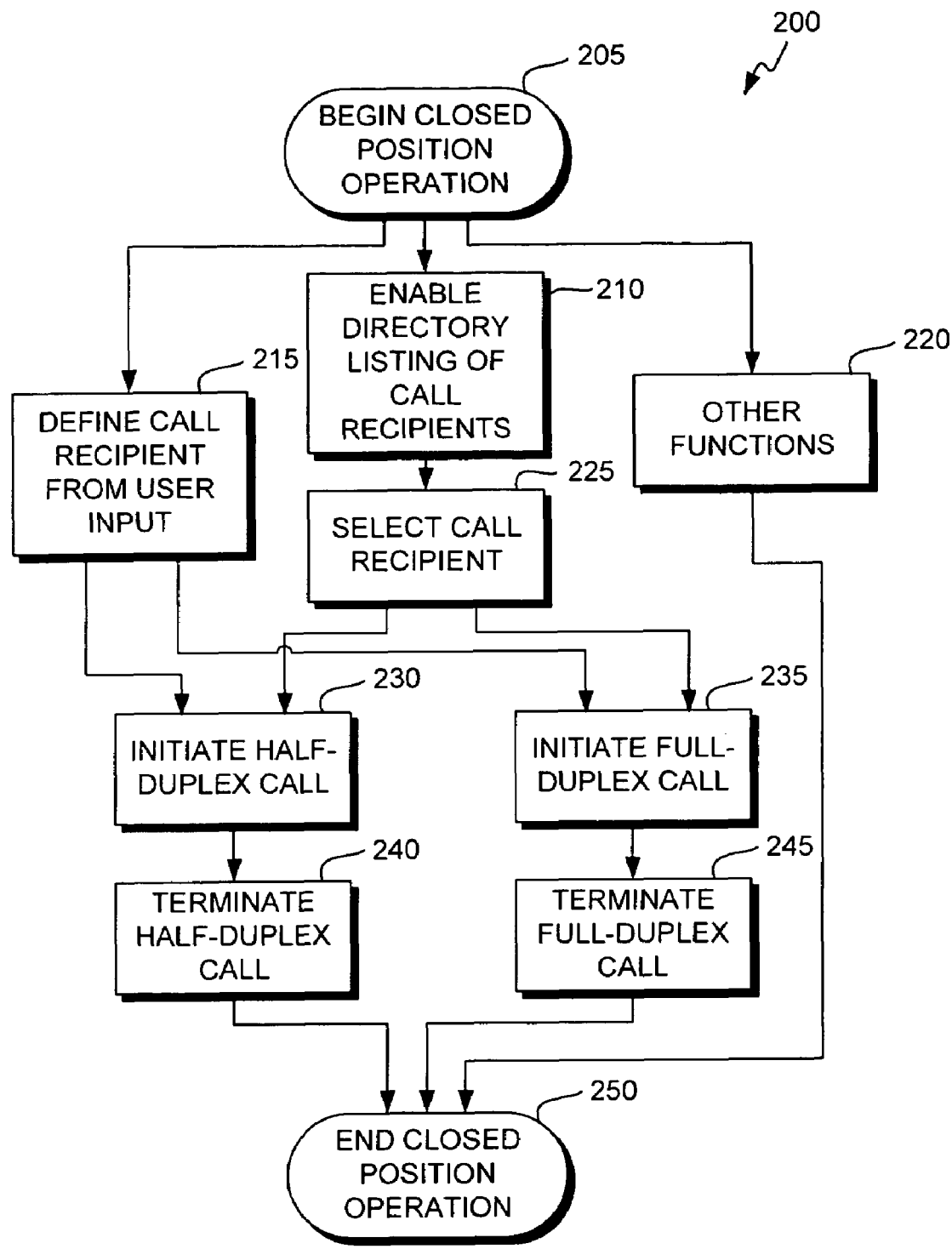
FIG. 2 illustrates a flow chart of an exemplary closed position operation of a wireless communication device according to one embodiment of the present invention.

Continuing with multi-position mobile phone 100, as depicted in the closed position in FIG. 1A, multi-position mobile phone 100 is capable of defining a call recipient and initiating a call to the call recipient when arranged in the closed position. Thus, a number of inconveniences associated with prior techniques are overcome according to various embodiment of the present invention. To illustrate these and other potential features, reference is now made to FIG. 2, which depicts flow chart 200 of an exemplary closed position operation of a wireless communication device, such as multi-position mobile phone 100, according to one embodiment of the present invention. Certain details and features have been left out of flow chart 200 of FIG. 2 that are apparent to a person of ordinary skill in the art. For example, a step may consist of one or more sub-steps, as known in the art. While steps 205 through 250 shown in flow chart 200 are sufficient to describe one embodiment of the present invention, other embodiments of the invention may utilize steps different from those shown in flow chart 200.

At step 205, multi-position mobile phone 100 is operable and is arranged in the closed position. Thus, multi-position mobile phone 100 is activated and connected to a power source. Closed position operation continues with step 210, step 215 or step 220.

At step 210, a directory listing of call recipients (or "phone book") is enabled upon receipt of a request from a user. The directory may, for example, be an electronically database stored in memory containing a listing of phone numbers associated with names, addresses, and other information. According to one embodiment, key 114 is a four state key, activated in an "up" position, a "down" position, and a "depressed" position, and returning to a "home" or unselected position when not activated. Employing key 114 is this manner, a user may move and hold key 114 in the up position to select a directory listing of all contacts. Alternatively, a user may move and hold key 114 in the down position to select a directory listing of a subset of all contacts, such as only those contacts capable of receiving single-duplex calls, for example. The directory listing can further be displayed to the user via display 124. Thus, the at least one external key 114 is capable of being activated for selecting a first directory of all call recipients and a second directory of call recipients capable of receiving single-duplex calls. One activates the at least one external key 114 for selecting a first directory of all call recipients and a second directory of call recipients capable of receiving single-duplex calls.

Next at step 225, after a particular directory listing has been enabled during step 210, key 114 may be moved in the up and down position to navigate through the directory listing and for selecting an individual call recipient. The selected call recipient can further be displayed to the user via display 124, such as by highlighting the selected recipient's name or phone number, for example. In this particular mode, backspace key 118 may be activated to reverse or cancel a selection of a call recipient or of a particular directory listing.

Alternatively, at step 215, a call recipient may be defined manually from input received from the user. By way of illustration, key 114 can be moved up, e.g., to increment a particular digit of a phone number of a call recipient, moved down, e.g., to decrement the digit, and depressed to select a digit and enter additional digits. In this particular mode, backspace key 118 may be activated to erase a previously entered digit.

At step 230, a single-duplex call is initiated to the call recipient selected from step 225 or step 215. Alternatively, at step 235 a full-duplex call is initiated to the selected call recipient. Single-duplex calls are distinguished from full-duplex calls in that only one party is able to transmit or "speak" in single-duplex communication. Single-duplex transmissions generally comprise a first step of "gaining the floor" and a second step of speaking. According to one embodiment, key 116 is selected to initiate the single-duplex call, and key 114 moved and held in the "depressed" position to initiate the full-duplex call. During the single-duplex call, key 116 may be activated by the user for "gaining the floor" and communicating by speaking into microphone 122. Speaker 120 generates acoustic signals communicated by one or more other parties during the call. During the full-duplex call, microphone 122 is also enabled to receive acoustic signals from the user, and speaker 120 generates acoustic signals communicated by one or more other parties during the call.

At step 240, the single-duplex call is terminated following step 230. At step 245, the full-duplex call is terminated following step 235.

Flowchart 200 also depicts alternative functions 220 which are capable of being executed by multi-position mobile phone 100 in the closed position, such as functions associated with receiving incoming calls, e.g., answering a call, displaying the phone number or identity of the calling party, turning on/off the phone, and adjusting the ring volume or ring alert mode, for example. Alternatively, other functions 220 may also comprise functions not related to receiving incoming calls, e.g., entering, updating or deleting phonebook entries, playing games, etc.

At step 250 the closed position operation of multi-position mobile phone 100 as depicted in flowchart 200 is concluded. Steps 205 through 250 may subsequently be repeated for performing additional closed position operations.

Particularly significant is that the operations associated with flow chart 200 is carried out while multi-position mobile phone 100 is arranged in the closed position. As such, multi-position mobile phone 100 does not require the user to first arrange the device in the open position prior to defining a call recipient and initiating a call to the call recipient, thereby eliminating many inconveniences associated with previously-known mobile phones. For example, in the exemplary embodiment involving half-duplex communications, the advantages of multi-position mobile phone 100 are particularly appreciable, since many half-duplex calls are conducted without requiring the user to hold the speaker of the mobile phone against or proximate the user's ear. Thus, multi-position mobile phone 100 allows the user to establish and conduct half-duplex calls while eliminating the inconvenient step of arranging and re-arranging multi-position mobile phone 100 as required by conventional multi-position mobile phones. Yet at the same time, the benefits of the compact size of multi-position mobile phone 100 overcomes the cumbersome disadvantages associated with single-position phones, as noted above.

The benefits of multi-position mobile phone 100 can also be realized with full-duplex communications as described above, where, for example, the user wishes to use speakerphone capabilities of multi-position mobile phone 100 or an external headset with multi-position mobile phone 100. As such, multi-position mobile phone 100 avoids the inconvenient steps associated with arranging and re-arranging multi-position mobile phone 100 as required by conventional multi-position mobile phones.

From the above description of exemplary embodiments of the invention, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. For example, it is manifest that keys 114, 116 and 118 described above in conjunction with FIGS. 1A, 1B and 2 are only exemplary, and that other key arrangements and function designations are suitable for use with the present invention. Furthermore, one or more of the benefits of the wireless communication device arrangement according to various embodiments as discussed above may be realized in other multi-position device shapes or form-factors, such as hinged (or "clam-shell") mobile phones, for example. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

What is claimed is:

1. A wireless communication device comprising:
a first housing portion having a first exterior surface with external keys;
a second housing portion having a second exterior surface with an external main display, the second housing portion capable of being arranged in a first closed position linearly aligned with and covering the external keys of the first housing portion and in a second open position linearly aligned with and not covering the external keys of the first housing portion, wherein the external main display faces in the same direction when wireless communication device is in the first closed position and the second open position;
a transceiver situated within one of the first and second housing portions, the transceiver coupled to an antenna for transmitting and receiving radio frequency signals; and
at least one external key situated on one of the first and second exterior surfaces, the at least one external key capable of being activated by a user when the second housing portion is arranged in the closed position for defining a call recipient and for initiating a call to the call recipient, and further capable of being activated for selecting a directory of call recipients and for selecting one of the call recipients, wherein the first housing portion defines a first plane and further includes an interior surface, wherein the second housing portion defines a second plane parallel with the first plane and covers the interior surface of the first housing portion when the second housing portion is arranged in the closed position and rotates about an axis perpendicular to the first plane and the second plane while maintaining a parallel relationship with the first housing portion uncovering the interior surface of the first housing portion when the second housing portion is arranged in the open position,
wherein in the first closed position, the wireless communication device is in a compact configuration and is configured for single-duplex communication, and in the second open position the wireless communication device is in a compact configuration and is configured for full-duplex communication.

2. A wireless communication device comprising:
a first housing portion having a first exterior surface;
a second housing portion having a second exterior surface, the second housing portion capable of being arranged in a first closed position relative to the first housing portion and in a second open position relative to the first housing portion;
a transceiver situated within one of the first and second housing portions, the transceiver coupled to an antenna for transmitting and receiving radio frequency signals; and
at least one external key situated on one of the first and second exterior surfaces, the at least one external key capable of being activated by a user when the second housing portion is arranged in the closed position for defining a call recipient and for initiating a call to the call recipient, and further capable of being activated for selecting a directory of call recipients and for selecting one of the call recipients, wherein the second exterior surface of the second housing portion includes a speaker capable of generating acoustic signals when the second housing portion is arranged in the closed position, the speaker located adjacent to the microphone when the second housing portion is arranged in the closed position and located at an opposite end of the wireless communication device when the second housing portion is arranged in the open position,
wherein in the first closed position, the wireless communication device is in a compact configuration and is configured for single-duplex communication, and in the second open position the wireless communication device is in an expanded configuration and is configured for full-duplex communication.

3. A wireless communication device comprising:
a first housing portion having a first exterior surface;
a second housing portion having a second exterior surface, the second housing portion capable of being arranged in a first closed position relative to the first housing portion and in a second open position relative to the first housing portion;
a transceiver situated within one of the first and second housing portions, the transceiver coupled to an antenna for transmitting and receiving radio frequency signals; and
at least one external key situated on one of the first and second exterior surfaces, the at least one external key capable of being activated by a user when the second housing portion is arranged in the closed position for defining a call recipient and for initiating a call to the call recipient, and further capable of being activated for selecting a directory of call recipients and for selecting one of the call recipients, wherein the at least one external key is further capable of being activated for selecting a first directory of all call recipients and a second directory of call recipients capable of receiving single-duplex calls,
wherein in the first closed position, the wireless communication device is in a compact configuration and is configured for single-duplex communication, and in the second open position the wireless communication device is in an expanded configuration and is configured for full-duplex communication.

4. A wireless communication device comprising: a first housing portion having a first exterior surface; a second housing portion having a second exterior surface, the second housing portion capable of being arranged in at least two different positions relative to the first housing portion including a first position and a second position such that when the second housing portion is arranged in the first position, a first dimension of the wireless communication device is smaller than a corresponding dimension of the wireless communication device when the second housing portion is arranged in the second position; a transceiver situated within one of the first and second housing portions, the transceiver coupled to an antenna for transmitting and receiving radio frequency signals; and at least one external key situated on one of the first and second exterior surfaces, the at least one external key capable of being activated by a user when the second housing portion is arranged in the first position for defining a call recipient and for initiating a call to the call recipient, and further capable of being activated for selecting a directory of call recipients and for selecting one of the call recipients, wherein the first housing portion defines a first plane and further includes an interior surface, wherein the second housing portion defines a second plane parallel with the first plane and covers the interior surface of the first housing portion when the second housing portion is arranged in the first position and rotates about an axis perpendicular to the first plane and the second plane while maintaining a parallel relationship with the first housing portion uncovering the interior surface of the first housing portion when the second housing portion is arranged in the open position, wherein in the first position, the wireless communication device is in a compact configuration and is configured for single-duplex communication, and in the second position the wireless communication device is in an expanded configuration and is configured for full-duplex communication.

5. A wireless communication device comprising: a first housing portion having a first exterior surface; a second housing portion having a second exterior surface, the second housing portion capable of being arranged in at least two different positions relative to the first housing portion including a first position and a second position such that when the second housing portion is arranged in the first position1 a first dimension of the wireless communication device is smaller than a corresponding dimension of the wireless communication device when the second housing portion is arranged in the second position; a transceiver situated within one of the first and second housing portions, the transceiver coupled to an antenna for transmitting and receiving radio frequency signals; and at least one external key situated on one of the first and second exterior surfaces, the at least one external key capable of being activated by a user when the second housing portion is arranged in the first position for defining a call recipient and for initiating a call to the call recipient, and further capable of being activated for selecting a directory of call recipients and for selecting one of the call recipients, wherein the at least one external key is further capable of being activated for selecting a first directory of all call recipients and a second directory of call recipients capable of receiving single-duplex calls, wherein in the first position, the wireless communication device is in a compact configuration and is configured for single-duplex communication, and in the second position the wireless communication device is in an expanded configuration and is configured for full-duplex communication.

6. A wireless communication device comprising: a first housing portion having a first exterior surface; a second housing portion having a second exterior surface, the second housing portion capable of being arranged in at least two different positions relative to the first housing portion including a first position and a second position such that when the second housing portion is arranged in the first position, a first dimension of the wireless communication device is smaller than a corresponding dimension of the wireless communication device when the second housing portion is arranged in the second position; a transceiver situated within one of the first and second housing portions, the transceiver coupled to an antenna for transmitting and receiving radio frequency signals; and at least one external key situated on one of the first and second exterior surfaces, the at least one external key capable of being activated by a user when the second housing portion is arranged in the first position for defining a call recipient and for initiating a call to the call recipient, and further capable of being activated for selecting a directory of call recipients and for selecting one of the call recipients, wherein the second exterior surface of the second housing portion includes a speaker capable of generating acoustic signals when the second housing portion is arranged in the first position, the speaker located adjacent to the microphone when the second housing portion is arranged in the first position and located at an opposite end of the wireless communication device when the second housing portion is arranged in the open position, wherein in the first position, the wireless communication device is in a compact configuration and is configured for single-duplex communication, and in the second position the wireless communication device is in an expanded configuration and is configured for full-duplex communication.

7. A method for operating a wireless communication device including a first housing portion and a second housing portion, the second housing portion capable of being arranged in a first closed position relative to the first housing portion and in a second open position relative to the first housing portion, the method comprising:

enabling for activation at least one external key situated a first exterior surface of one of the first and second housing portions when the second housing portion is arranged in the first closed position;

selecting a directory of call recipients responsive to input signals received via the at least one external key; and selecting one of the call recipients responsive to input signals received via the at least one external key, wherein the first housing portion defines a first plane and further includes an interior surface, wherein the second housing portion defines a second plane parallel with the first plane and covers the interior surface of the first housing portion when the second housing portion is arranged in the first closed position and rotates about an axis perpendicular to the first plane and the second plane while maintaining a parallel relationship with the first housing portion uncovering the interior surface of the first housing portion when the second housing portion is arranged in the second open position, and the method further comprising rotating the second housing portion from the first closed position to the second open position about an axis perpendicular to the first plane and the second plane while maintaining a parallel relationship with the first housing portion, wherein in the first closed position, the wireless communication device is in a compact configuration and is configured for single-duplex communication, and in the second open position the wireless communication device is in an expanded configuration and is configured for full-duplex communication.

8. A method for operating a wireless communication device including a first housing portion and a second housing portion, the second housing portion capable of being arranged in a first closed position relative to the first housing portion and in a second open position relative to the first housing portion, the method comprising:

enabling for activation at least one external key situated a first exterior surface of one of the first and second housing portions when the second housing portion is arranged in the first closed position;

selecting a directory of call recipients responsive to input signals received via the at least one external key; and selecting one of the call recipients responsive to input signals received via the at least one external key, wherein the second exterior surface of the second housing portion includes a speaker capable of generating acoustic signals when the second housing portion is arranged in the first closed position, the speaker located adjacent to the microphone when the second housing portion is arranged in the first closed position and located at an opposite end of the wireless communication device when the second housing portion is arranged in the second open position, and the method further comprising moving the second housing portion from the first closed position where the speaker is located adjacent to the microphone to the second open position where speaker is located at an opposite end of the wireless communication device, wherein in the first closed position, the wireless communication device is in a compact configuration and is configured for single-duplex communication, and in the second open position the wireless communication device is in an expanded configuration and is configured for full-duplex communication.

9. The method of claim 8 wherein the at least one external key is further capable of being activated for selecting a first directory of all call recipients and a second directory of call recipients capable of receiving single-duplex calls, and the method further comprising activating the at least one external key for selecting a first directory of all call recipients and a second directory of call recipients capable of receiving single-duplex calls.

\* \* \* \* \*